US005678196A

United States Patent [19]

Doyle

[11] Patent Number: 5,678,196

[45] Date of Patent: Oct. 14, 1997

[54] METHOD AND APPARATUS FOR DISPLAYING MESSAGES IN VEHICULAR COMMUNICATIONS SYSTEMS

[75] Inventor: Thomas F. Doyle, San Diego, Calif.

[73] Assignee: QUALCOMM Incorporated, San Diego, Calif.

[21] Appl. No.: 597,317

[22] Filed: Feb. 6, 1996

Related U.S. Application Data

[63] Continuation of Ser. No. 359,110, Dec. 19, 1994, abandoned.

[51] Int. Cl.[6] .......... H04B 7/26

[52] U.S. Cl. .......... 455/54.1; 340/993; 364/460

[58] Field of Search .......... 455/12.1, 345, 455/346, 347, 349, 38.1, 38.2, 38.4, 54.1, 54.2, 154.1, 157.2, 158.1, 158.2, 158.4, 158.5; 370/104.1; 340/825, 990, 993, 995; 364/460, 424.01, 424.03; 379/59, 60

[56] References Cited

U.S. PATENT DOCUMENTS

| | | | |
|---|---|---|---|
| 3,924,240 | 12/1975 | Given | 340/172.5 |
| 4,264,979 | 4/1981 | Gatowski | 455/77 |
| 4,555,694 | 11/1985 | Yanagishima et al. | 340/524 |
| 4,803,487 | 2/1989 | Willard et al. | 340/825.44 |
| 4,804,937 | 2/1989 | Barbiaux et al. | 340/52 F |
| 4,979,170 | 12/1990 | Gilhousen et al. | 370/104.1 |
| 5,086,510 | 2/1992 | Guenther et al. | 455/90 |
| 5,239,700 | 8/1993 | Guenther et al. | 455/158.4 |
| 5,266,922 | 11/1993 | Smith et al. | 340/525 |

FOREIGN PATENT DOCUMENTS

| | | | |
|---|---|---|---|
| 0295984 | 5/1988 | European Pat. Off. | G08G 1/12 |
| 0367935 | 9/1989 | European Pat. Off. | H04Q 7/04 |
| 3918668 | 6/1989 | Germany | G08G 1/09 |

*Primary Examiner*—Reinhard J. Eisenzopf
*Assistant Examiner*—Lee Nguyen
*Attorney, Agent, or Firm*—Russell B. Miller

[57] ABSTRACT

A method and apparatus for displaying, to the driver of a vehicle, an introductory or other portion of messages received by a mobile communications terminal of the vehicle. The message display method may be implemented in a system which includes one or more vehicles in communication with a central control station. At least one of the vehicles is equipped with a mobile communications terminal for communication with the central control station. In a preferred implementation, the mobile communications terminal is coupled to an internal data link of the one vehicle, to which is also connected a display device in view of the vehicle driver. A first message packet is generated, at the central control station, for use by the vehicle driver. The first message packet is then transmitted from the central control station and received by the mobile communications terminal. In a preferred embodiment, an introductory or other portion of the first message packet is provided to the display device by way of the internal data link. This advantageously allows the vehicle driver to be apprised of the contents of incoming messages even without direct access to the mobile communications terminal.

9 Claims, 2 Drawing Sheets

METHOD AND APPARATUS FOR DISPLAYING MESSAGES IN VEHICULAR COMMUNICATIONS SYSTEMS

This is a continuation of application Ser. No. 08/359,110, filed Dec. 19, 1994 abandoned.

BACKGROUND OF THE INVENTION

I. Field of the Invention

The present invention relates to communications systems employing message transmitting stations and relay stations to send messages to mobile vehicle communications terminals. More specifically, the present invention relates to a novel method and apparatus for informing vehicle drivers of the contents of messages received by such terminals.

II. Description of the Related Art

A need is recognized by many in the mobile vehicle environment for vehicle location and dispatch messaging capability. There are a substantial number of commercial, governmental, and private applications requiring the delivery of relatively short messages to or from a large number of geographically dispersed terminals, or mobile transceivers, often on an irregular basis. The need for message services includes, for example, aviation, navigation, commercial transportation, and message delivery services.

Other examples include the commercial trucking industry, where dispatchers wish to communicate short messages to trucks located anywhere in the continental United States, especially in rural areas. Until recently the transfer of such messages was restricted to periodic telephonic communication between drivers and a central dispatcher. However, it proved to be difficult, if not impossible, for drivers to consistently "call in" at fixed, scheduled, times since telephone services are not always readily available in many areas.

Aside from conventional telephone systems, other communication systems have attempted to address the mobile market. Radio telephone, cellular telephone, and portable radio transceivers (CB) are all capable of providing some form of communication between a mobile transceiver and a base unit. However, a number of factors have rendered these systems inadequate as message communication systems for serving a large number of widely dispersed users. For example, the lower power transmissions within each of an array of cells within cellular communication systems are prone to frequency selective fading and signal blocking. Moreover, highly mobile units such as trucks are required to frequently change channels as new cells within the cellular system are traversed. Direct communication, non-cellular radio systems have proven to be similarly disadvantageous due to frequent system overload and susceptibility to interference from other communications systems.

A communication system based on Earth orbital relay satellites has been developed in an effort to overcome these difficulties and provide for continuous delivery of messages and related control information to a large number of users over a wide geographic area. Such a satellite-based message communication system is described in, for example, U.S. Pat. No. 4,979,170, entitled ALTERNATING SEQUENTIAL HALF DUPLEX COMMUNICATION SYSTEM, which is assigned to the assignee of the present invention and which is herein incorporated by reference.

In addition to a dependence upon systems for providing messaging capability to remote mobile units, certain industries also share a requirement for reliable mobile unit location information. One industry in particular in which such information is particularly desirable is the commercial trucking industry. In the commercial trucking industry an efficient and accurate method of vehicle position determination is in demand. With ready access to vehicle location information, the trucking company home base obtains several advantages. The trucking company can keep the customer apprised of location, route and estimated payload time of arrival. The trucking company can also use vehicle location information together with empirical data on the effectiveness of routing, thereby determining the most economically efficient routing paths and procedures.

In U.S. Pat. No. 5,017,926 (the '926 patent), entitled DUAL SATELLITE NAVIGATION SYSTEM, issued May 21, 1991, which is assigned to the assignee of the present invention, there is disclosed a system in which the communications terminal at each mobile unit is capable of determining position in addition to providing messaging capability. The system of the '926 patent relies upon the theory of trilateration in, for example, the determination of mobile vehicle position. Trilateration prescribes that if the position of three objects are known relative to each other, and the distance from each these three objects to a fourth object is known, then the three dimensional position of the fourth object can be determined within the coordinate frame which described the position of the first three objects. In the system of the '926 patent, the first two of the three known positions correspond to the locations of a pair of satellites, while the third position is at the center of the Earth.

Using the satellite communication capability at each mobile terminal to provide vehicle position determination offers great advantages to the commercial trucking and related parcel delivery industries. For example, this capability obviates the need for truck drivers themselves, via telephones, to provide location reports regarding their vehicle position to the trucking company home base. These location reports are intermittent at best, because they occur only when the truck driver has reached a destination or stopover site, and require the expenditure of the driver's time to phone the trucking company home base. This method of location report also leaves room for substantial inaccuracies. For example, truck drivers may report incorrect location information either mistakenly or intentionally; or report inaccurate estimates of times of arrival and departure.

In contrast, the use of satellite communication capability at each truck enables the location trucking company home base to identify the longitude/latitude position of each truck at will, thus avoiding the disadvantages associated with intermittent location reports. For example, the "down time" (i.e., periods of zero revenue production) of idle trucks is minimized since the communications necessary for determining location could take place while trucks are en route. Also, inaccuracies in location reports are virtually eliminated because the trucking company home base is able to ascertain accurate truck location nearly instantaneously.

The mobile communications terminal (MCT) of each fleet vehicle also allows the vehicle driver or occupant to communicate via satellite at least some form of limited message or acknowledgment to the central control station in response to received messages. A reply message may prevent the need for further communications or may indicate a need for an additional instruction or updated message from new information provided by a vehicle driver. The return link allows a driver to send messages via the mobile communications terminal such as a verification of time and delivery information, or a report on current position or other status information.

Unfortunately, the mobile communications terminal of each fleet vehicle is typically implemented so as to be inaccessible to the driver during normal vehicle operation. This requires the driver to periodically stop the vehicle in order to query, by way of a keyboard or the like, the mobile communications terminal as to the contents of messages recently received thereby. This may reduce efficiency, since the driver may be required to occasionally stop the vehicle for no other reason than to review message information stored within the mobile communications terminal. More seriously, it is possible that drivers might endanger themselves and others by attempting to access the mobile communications terminal while simultaneously engaged in vehicle operation.

Accordingly, it is an object of the present invention to apprise vehicle drivers of the content of messages received by vehicle mobile communications terminals, thereby obviating the need for intermittent driver access to the full text of such messages.

SUMMARY OF THE INVENTION

In summary, the present invention provides a method and apparatus for displaying, to the driver of a vehicle, an introductory or other portion of messages received by a mobile communications terminal of the vehicle. The present invention may be implemented in a communications system which includes one or more vehicles in communication with a central control station. At least one of the vehicles is equipped with a mobile communications terminal for communication with the central control station. In a preferred implementation, the mobile communications terminal is coupled to an internal data link of the one vehicle, to which is also connected a display device in view of the vehicle driver.

A first message packet is generated, at the central control station, for use by the vehicle driver. The first message packet is then transmitted from the central control station and received by the mobile communications terminal. In a preferred embodiment, an introductory or other portion of the first message packet is provided to the display device by way of the internal data link. The present invention thus advantageously allows the vehicle driver to be apprised of the contents of incoming messages even without direct access to the mobile communications terminal.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE PREFERRED EMBODIMENTS

The present invention provides a method and apparatus for displaying, to the driver of a vehicle, an introductory or other portion of messages received by a mobile communications terminal of the vehicle. The present invention may be implemented within a system in which a central control station is in communication with a fleet of vehicles. Each of the vehicles includes a mobile communications terminal for communication with the central control station. A first mobile communications terminal of a first of the vehicles is coupled to an internal data link of the first vehicle, thereby allowing message information to be communicated to a driver of the first vehicle through a display device connected to the internal data link.

More particularly, a first message packet intended to be conveyed to the driver of the first vehicle using the first mobile communications terminal is initially generated at the central control station. The message packet is then transmitted from the central control station to the first mobile communications terminal. A portion of the first message packet is then sent to the display device over the internal data link. This allows a vehicle driver to be informed of the content of messages received by the mobile communications terminal even when the driver is otherwise incapable of direct access to the terminal.

Figure 1:
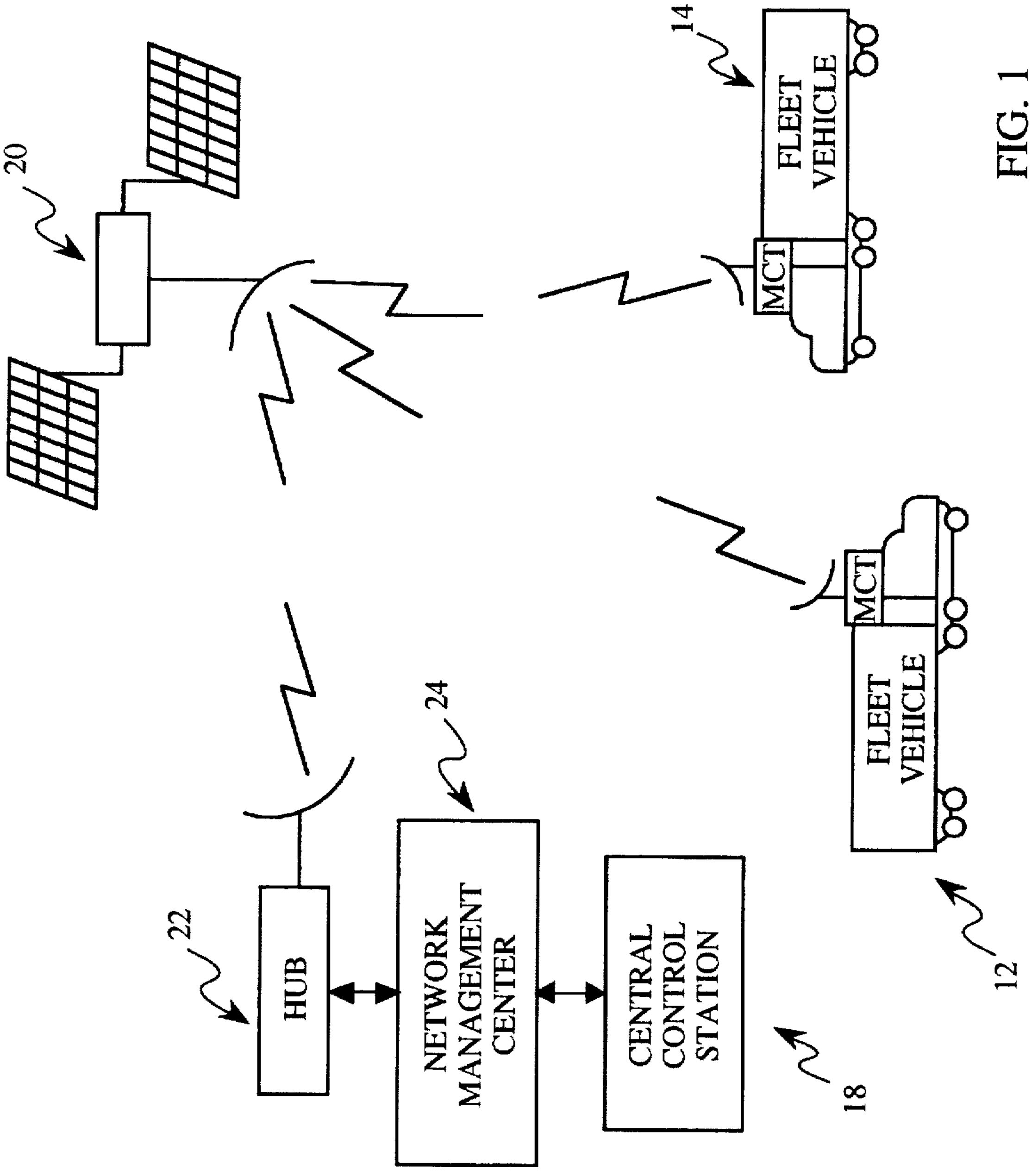
FIG. 1 depicts an exemplary implementation of a mobile communications network.

In order to clarify description of the invention, an exemplary radio communications network facilitating information exchange between a base station and a vehicle fleet is described by way of background with reference to FIG. 1.

Referring to FIG. 1, the mobile communications network may comprise, for example, a conventional cellular communication system designed to provide service between user vehicles within specified geographic areas, or "cells". Alternately, the present invention may be embodied within a satellite communication system of the type capable of facilitating communication between one or more central control stations and a plurality of user vehicles distributed over a wide geographic area. Such a satellite-based message communication system is described in, for example, U.S. Pat. No. 4,979,170, entitled ALTERNATING SEQUENTIAL HALF DUPLEX COMMUNICATION SYSTEM, which is assigned to the assignee of the present invention and which is herein incorporated by reference.

Referring now to FIG. 1 in greater detail, an overview is provided of a communication network 10 within which fleet vehicles 12, 14 communicate with a central control station 18. In FIG. 1, the fleet vehicles 12, 14 each have a mobile communications terminal (MCT). The fleet vehicles 12, 14 are representative of any of a variety of vehicles (e.g., freight trucks) whose drivers or other occupants desire to obtain occasional or updated information, status reports, or messages from a central control station 18. Although the communication network of FIG. 1 relies upon a satellite communication link between the vehicles 12, 14 and the central control station 18, it is again noted that the teachings of the present invention are equally applicable to terrestrial cellular or mobile radio communications systems in which communication is established between a central facility and one or more mobile units.

The mobile communications terminal (MCT) of each fleet vehicle also allows the vehicle driver or occupant to communicate via satellite at least some form of limited message or acknowledgment to the central control station in response to received messages. A reply message may prevent the need for further communications or may indicate a need for an additional instruction or updated message from new information provided by a vehicle driver. The return link allows a driver to send messages via the mobile communications terminal such as a verification of time and delivery information, or a report on current position or other status information.

Referring now to FIG. 1 in greater detail, messages from the mobile communications terminals of the vehicles 12, 14 are transmitted to the satellite 20 and relayed thereby to a central transmission facility or terminal 22 referred to as a Hub facility. The central terminal or Hub 22 can be placed at a location proximate the central control station 18 allowing lower cite costs and local, direct access to transmission equipment for maintenance and system upgrade. Alternatively, the Hub 22 is located in a remote location more ideally suited for low interference ground-to-satellite transmission or reception. In this case, a telephonic, optical or satellite communication link is utilized to establish communication either directly between the Hub 22 and the central control station 18, or alternately between the Hub 22 and central control station 18 by way of a network management center (NMC) 24. When messaging is to take place not only between the vehicles 12, 14 and the central control station 18, but also between the vehicles 12, 14 and one or more service provider control stations, 18, the network management center 24 enables more efficient control over the priority, access, accounting, and transfer characteristics of message data. Additional details of the communication hardware utilized in an exemplary implementation of the Hub 22 and network management center 24 are described in the aforementioned U.S. Pat. No. 4,979,170.

Information is generally sent over the communication channels in discrete packets ranging in length from, for example, 4 to 256 characters. Each packet is generally segmented into fields of information such as the type of message, the length of the message, and the checksum bits. In addition, each message is typically preceded by a header which includes an "individual" serial number specifying a single mobile communications terminal, a "group" address identifying a set of mobile communications terminals, or an "all-call" address corresponding to all of the mobile communications terminals within the system. By providing these alternate addresses to which a mobile communications terminal can respond, it is possible to efficiently transfer single messages to designated groups of mobile communications terminals.

At each mobile communications terminal a transceiver is employed to receive and demodulate communication downlink signals received from the satellite 20. The downlink signals are received by an antenna and transferred through a diplexer into a demodulator (each not shown) for demodulation. The demodulator employs elements known in the art for down-converting the received communication signal to a lower IF frequency level, and then to a symbol frequency level as an encoded symbol stream (i.e., digital message).

Figure 2:
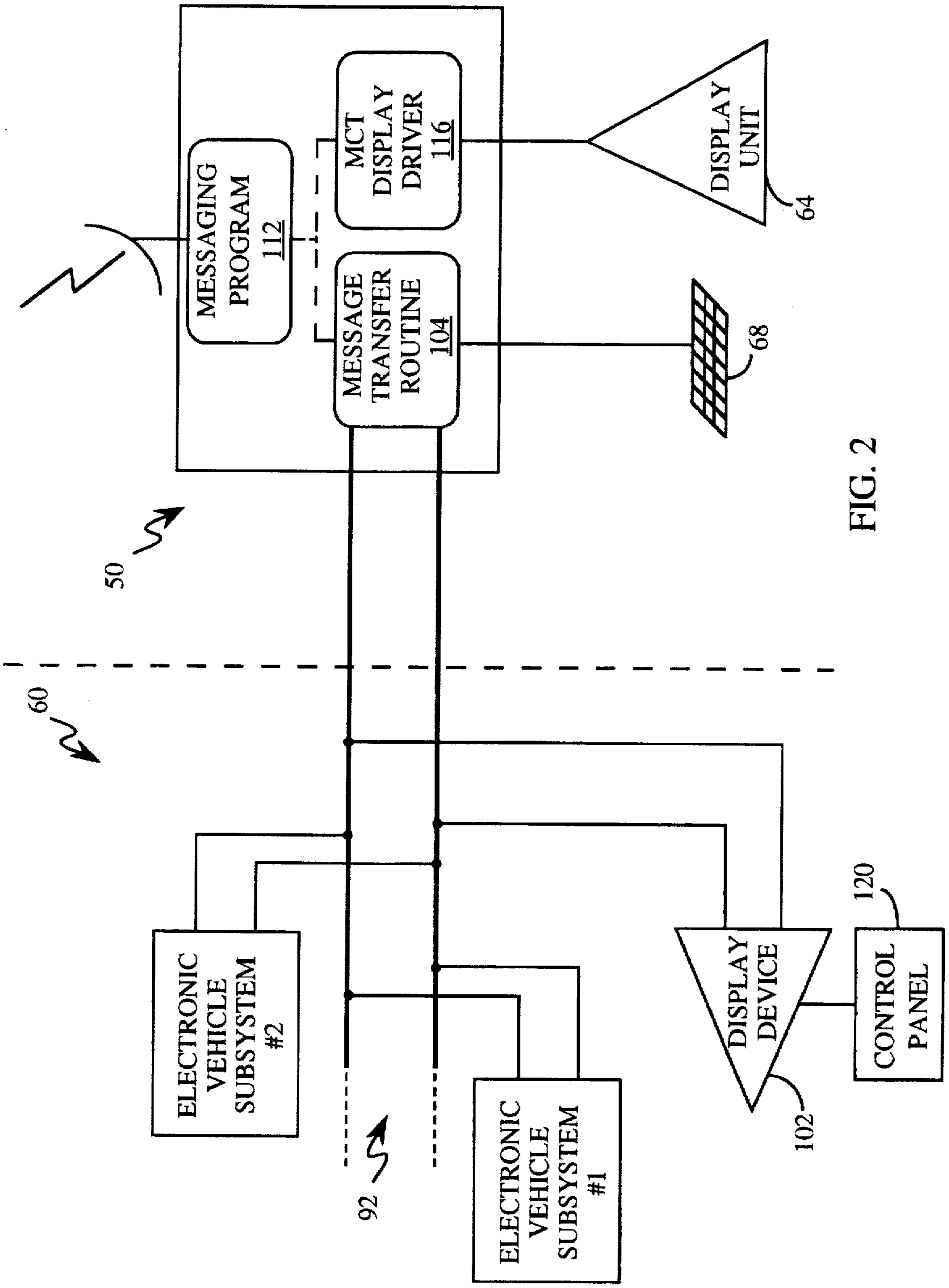
FIG. 2 shows a block diagram representation of a mobile communications terminal (MCT) coupled to the electrical control system of an exemplary fleet vehicle.

Referring now to FIG. 2, there is shown a block diagram representation of a mobile communications terminal (MCT) 50 coupled to the electrical control system 60 of an exemplary fleet vehicle. The received communication signal processed by the MCT 50 is normally conveyed to the vehicle driver using a display unit 64 such as, for example, an LED, LCD, electroluminescent or discharge type element character display. Alternatively, the message may be interfaced to other processing elements, such as a portable computer, or printed out by a hard copy device such as a small thermal printer. However, in both cases the received message is registered by the display unit 64 or other device only after the vehicle driver issues a request through the keyboard 68.

Unfortunately, both the keyboard 68 and display unit 64 of the mobile communications terminal are typically implemented so as to be inaccessible to the driver during normal vehicle operation. This requires the driver to periodically stop the vehicle in order to query, by way of a keyboard or the like, the mobile communications terminal so as to examine the contents of messages recently received thereby. This may reduce efficiency, since the driver may be required to occasionally stop the vehicle for no other reason than to review message information stored within the mobile communications terminal. More seriously, it is possible that drivers might endanger themselves and others by attempting to access the mobile communications terminal while simultaneously operating their vehicle.

In accordance with the invention, each fleet vehicle (e.g., vehicles 12, 14) is configured with a display device in view of the vehicle driver. The display device and the mobile communications terminal are also both connected to the vehicle's internal data link, thereby allowing an introductory portion of each message received by the mobile communications terminal to be displayed to the driver for a predetermined period of time. In this way both safety and efficiency are enhanced by obviating the need for intermittent driver access to the full text of messages recently received and stored by the mobile communications terminal.

Referring to FIG. 2, connected to the vehicle data link 92 are the mobile communications terminal (MCT) 50, and one or more electronic vehicle subsystems (e.g., engine control and braking subsystems). An internal cabin display device 102 in view of the vehicle driver is also connected to the internal data link 92. In a preferred embodiment, the physical structure of the data link 92 is specified by a well known standard prescribed by the Society of Automotive Engineers (SAE), i.e., SAE J1708. The display device 102 may be implemented using a supplementary electronic display mounted within the vehicle cabin, or alternately may comprise existing built-in electronic dash instrumentation. As is described hereinafter, a message transfer routine 104 within the mobile communications terminal 50 transfers a predefined portion of each message packet received by the MCT 50 to the display device 102 over the data link 92. In this way the message transfer routine 104, in conjunction with the display device 102, allow the vehicle driver to be informed of the content of incoming message information even when access is not available to the MCT display unit 64 nominally used for message display.

The MCT 50 will generally include a messaging program 112 through which communication is maintained with the network management center (NMC) 24. In a preferred embodiment, messages for the vehicle driver received by the messaging program 112 are transferred to both the message transfer routine 104 and an MCT display driver 116. The display driver 116 provides the full text of the received message to the MCT display unit 64 in a conventional manner.

In accordance with the invention, an introductory portion of each received message is excised by the message transfer routine 104 and conveyed over the data link 92. This conveyance may be performed in accordance with, for example, the messaging protocol for vehicle data links promulgated by the Society of Automotive Engineers (i.e., SAE J1587). However, it is understood that other protocols may be employed without departing from the scope of the present invention. Information is typically transferred in conformance with the referenced SAE standards by using various predefined types of information packets, each of which is no longer than 21 bytes. One of the packet types is designated to include "free-formatted" message information. The SAE J1587 standard also provides for the transmission of free-formatted messages too large to be accommodated by a single packet by using a sequence of two or more packets.

In an exemplary embodiment, the message transfer routine 104 will generally utilize one or more free-formatted packets to transfer an introductory portion of each received message to the display device 102. When the received message is in a textual format, the message packets sent to display device 102 will convey a predetermined-length character string comprising the introductory portion of the message text.

Associated with each message packet placed upon the data link 92, "free-formatted" and otherwise, is message header information which includes a numerical identifier corresponding to a vehicle subsystem connected to the data link. Accordingly, the display device 102 will also be assigned such a numerical identifier in order that the free-formatted packets placed upon the data link 92 may be retrieved by display device 102. In a preferred embodiment, a single one of the free-formatted message packets specified by SAE J1587 is utilized to transfer an introductory message portion of up to 16 bytes. Alternately, when more than a single free-formatted packet is employed to transfer an introductory message portion to the display device 102, the contents of each successively retrieved packet may be stored within a buffer of display device 102. In such instances the message transfer routine 104 may initially issue a control message indicating that a sequence of free-formatted packets will be used to transfer the introductory message portion.

The SAE J1587 standard prescribes that each free-formatted message packet is to include 21 bytes of information, the first of which identifies the originating device (i.e., the MCT). The second byte identifies the packet as constituting a free-formatted, single-segment message packet. The third byte of each free-formatted packet specifies the type of device intended to receive the packet, which in the present system comprises a display device. In addition, the last byte of each free-formatted packet consists of a checksum byte used for error detection. It follows that 17 bytes of each 21-byte free-formatted packet are available to transfer message information to the display device 102.

In a preferred embodiment, the first byte of the 17-byte "body" of each free-formatted packet is used as a control byte to identify the type of information being conveyed by the remaining 16 bytes within the packet body. For example, the control byte may specify that the other 16 bytes will include text to be displayed via the display device 102. In another case, the control byte may indicate that the body of the packet is being used to provide contrast control or other display adjustment information to the display device 102.

It is a feature of the present invention that message transfer between the MCT 50 and display device 102 may be effected using existing communication hardware, and requires no intervention by the vehicle driver. Moreover, when the display device comprises electronic instrumentation already incorporated within the vehicle dash, additional display hardware is not required. Such electronic dash instrumentation is becoming increasingly prevalent in freight vehicles.

In an exemplary implementation, each introductory message portion is displayed to the vehicle driver for a predetermined period of time. Alternately, the display device 102 may include a control panel 120 including, for example, a blanking switch for clearing the display device screen. This allows each introductory message portion to be displayed for a time period desired by the vehicle driver.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be acccorded the widest scope consistent with the principles and novel features disclosed herein.

I claim:

1. A message display system for displaying messages within a vehicle, comprising:

display means, disposed within said vehicle, for providing a visual indication of addressed message data having an address associated with said display means; and communication terminal means for receiving message information at said vehicle, said communication terminal means including message transfer means for identifying a selected portion of said message information corresponding to said addressed message data and for providing display device control information to said display means using at least one other message packet, said at least one other message packet including a control segment for indicating that said display device control information is contained within said at least one other message packet.

2. The message display system of claim 1 wherein said vehicle includes a data link for facilitating communication between devices coupled thereto, said display means and said message transfer means being coupled to said data link with said message transfer means including means for coupling said selected portion of said message information to said data link.

3. The message display system of claim 1 wherein said communications terminal means further includes display driver means for providing, to a communications terminal display unit, said message information in response to a display instruction, said display system further including operator interface means for generating said display instruction in accordance with operator input provided thereto.

4. A message display system for displaying messages within a vehicle, said vehicle including a data link to which are coupled one or more vehicle subsystems, said display system comprising:

a display device, coupled to said data link, for providing a textual representation of addressed message data provided thereto over said data link, said display device including means for retrieving said message data from said data link based upon address information accompanying said message data; and a communications terminal coupled to said data link, said communications terminal including:

means for receiving message information at said vehicle, and message transfer means for identifying a selected portion of said message information corresponding to said addressed message data and for providing display device control information to said display means using at least one other message packet, said at least one other message packet including a control segment for indicating that said display device control information is contained within said at least one other message packet.

5. The message display system of claim 4 wherein said communications terminal further includes:

a messaging program module for processing said message information received at said vehicle, a display driver for providing, to a communications terminal display unit, processed message information from said messaging program module in response to a display instruction, and an operator interface for generating said display instruction in accordance with operator input provided thereto.

6. The message display system of claim 4 wherein said selected portion of said message information comprises an introductory portion of said message information, said introductory portion of said message information including an introductory character string.

7. A method for communicating addressed message information to vehicle occupants, comprising the steps of:

generating, at a central control station, said addressed message information;

transmitting said addressed message information from said central control station to one or more vehicles;

receiving said addressed message information from said central control station by a mobile communications terminal located within said vehicle;

separating a portion of said addressed message information representing an introductory portion of said addressed message information;

sending said portion of said addressed information to a remote display device for viewing by said vehicle occupants; and displaying said portion of said addressed information by said remote display device to said vehicle occupants.

8. The method of claim 7 further including the step of displaying, in view of said vehicle occupants, said portion of said addressed message information for a predetermined interval using said remote display device.

9. A system for communicating addressed message information to vehicle occupants, comprising:

a central control station in communication with one or more vehicles, each of said vehicles including a mobile communications terminal for communication with said central control station wherein said mobile communications terminal is coupled to an internal data link of each of said vehicles;

means for generating, at said central control station, said addressed message information;

means for transmitting said addressed message information from said central control station to each of said mobile communications terminals;

means, disposed within said mobile communications terminal, for selecting and transmitting a portion of said addressed message information representing an introductory portion of said addressed message information to said internal data link; and means for receiving and displaying said portion of said addressed message information from said internal data link to said vehicle occupants.

* * * * *